US009921747B2

(12) United States Patent
Wheeler et al.

(10) Patent No.: US 9,921,747 B2
(45) Date of Patent: Mar. 20, 2018

(54) UNIFYING MEMORY CONTROLLER

(71) Applicant: HEWLETT PACKARD ENTERPRISE DEVELOPMENT LP, Houston, TX (US)

(72) Inventors: Andrew R. Wheeler, Fort Collins, CO (US); Boris Zuckerman, Marblehead, MA (US); Greg Astfalk, Parker, TX (US); Russ W. Herrell, Fort Collins, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/114,427

(22) PCT Filed: Jan. 31, 2014

(86) PCT No.: PCT/US2014/014185
§ 371 (c)(1),
(2) Date: Jul. 27, 2016

(87) PCT Pub. No.: WO2015/116173
PCT Pub. Date: Aug. 6, 2015

(65) Prior Publication Data
US 2016/0342333 A1 Nov. 24, 2016

(51) Int. Cl.
*G06F 3/06* (2006.01)
*G06F 12/08* (2016.01)
(Continued)

(52) U.S. Cl.
CPC ............. *G06F 3/0604* (2013.01); *G06F 3/06* (2013.01); *G06F 3/0631* (2013.01);
(Continued)

(58) Field of Classification Search
CPC ............ G06F 12/0638; G06F 12/0646; G06F 12/0647
See application file for complete search history.

(56) References Cited

U.S. PATENT DOCUMENTS

| 7,603,488 B1 | 10/2009 | Gravenstein et al. |
| 8,527,690 B2 | 9/2013 | Hamilton et al. |

(Continued)

FOREIGN PATENT DOCUMENTS

| CN | 103400598 A | 11/2013 |
| KR | 10-2009-0017238 | 2/2009 |

(Continued)

OTHER PUBLICATIONS

Haghdoost, Alireza, "Offline Data Placement Algorithms for Multipath Hybrid Storages," (Research Paper), Dec. 18, 2011, Available at http://www-users.cselabs.umn.edu/classes/Fall-2011/csci8980-ass/files/Data%20Placement.pdf, (last accessed on Dec. 31, 2013).

(Continued)

*Primary Examiner* — Hal Schnee
(74) *Attorney, Agent, or Firm* — International IP Law Group, PLLC

(57) ABSTRACT

A unifying memory controller (UMC) to send and receive data to and from a local host. The UMC also may manage data placement and retrieval by using an address mapper. The UMC may also selectively provide power to a plurality of memory locations. The UMC may also manage data placement based on a policy that can make use of a property stored in the metadata storage location. The property may be a property describing the data that is being managed. The UMC also may use its own local cache that may store copies of data managed by the circuit.

18 Claims, 6 Drawing Sheets

(51) Int. Cl.
*G06F 13/16* (2006.01)
*G06F 12/02* (2006.01)
*G06F 12/0802* (2016.01)
*G06F 13/40* (2006.01)

(52) U.S. Cl.
CPC .......... *G06F 3/0638* (2013.01); *G06F 3/0647* (2013.01); *G06F 3/0683* (2013.01); *G06F 12/0223* (2013.01); *G06F 12/0802* (2013.01); *G06F 13/16* (2013.01); *G06F 13/1694* (2013.01); *G06F 13/4068* (2013.01); *G06F 2212/60* (2013.01); *Y02B 60/1228* (2013.01); *Y02B 60/1235* (2013.01)

(56) References Cited

U.S. PATENT DOCUMENTS

| | | | | |
|---|---|---|---|---|
| 8,903,772 | B1* | 12/2014 | Hayden | G06F 17/30091 707/649 |
| 2005/0091342 | A1* | 4/2005 | Frey | G06F 9/4435 709/219 |
| 2006/0004957 | A1* | 1/2006 | Hand, III | G06F 12/0866 711/113 |
| 2007/0299959 | A1* | 12/2007 | Penny | G06F 3/0607 709/223 |
| 2009/0043831 | A1 | 2/2009 | Antonopoulos et al. | |
| 2009/0113162 | A1* | 4/2009 | Di-Zenzo | G06F 1/3225 711/171 |
| 2010/0138460 | A1* | 6/2010 | Ogasawara | G06F 12/0276 707/813 |
| 2010/0157674 | A1 | 6/2010 | Cornwell et al. | |
| 2012/0110259 | A1* | 5/2012 | Mills | G06F 13/00 711/113 |
| 2012/0290781 | A1 | 11/2012 | Seo et al. | |
| 2013/0332667 | A1 | 12/2013 | Uchigaito et al. | |
| 2014/0229656 | A1* | 8/2014 | Goss | G06F 12/0246 711/103 |
| 2015/0046394 | A1* | 2/2015 | Onda | G06F 17/30203 707/623 |
| 2015/0186076 | A1* | 7/2015 | Andrews | G06F 3/0685 711/113 |
| 2015/0199268 | A1* | 7/2015 | Davis | G06F 12/0246 711/103 |

FOREIGN PATENT DOCUMENTS

| | | |
|---|---|---|
| KR | 20090017238 A | 2/2009 |
| TW | 201333699 A | 8/2013 |
| WO | WO-2013-101209 A1 | 7/2013 |

OTHER PUBLICATIONS

Hu, Jingtong et al., "Data Allocation Optimization for Hybrid Scratch Pad Memory With SRAM and Nonvolatile Memory," IEEE Transactions on Very Large Scale Integration (VLSI) Systems, vol. 21, No. 6, Jun. 2013, pp. 1094-1102, Available at http://www.cadathlon.com/refs/p4-system-1.pdf (last accessed Dec. 31, 2013).

Tian, Yi et al., "Efficient Data Placement for Processor-In-Memory Array Processors," (Research Paper), Nov. 7, 2007, 6 pages, Available at http://citeseerx.ist.psu.edu/viewdoc/download?doi=10.1.1.48.9493&rep=rep1&type=pdf (last accessed on Dec. 31, 2013).

* cited by examiner

400

500

UNIFYING MEMORY CONTROLLER

BACKGROUND

Computer data storage is traditionally divided into a hierarchy between at least memory and storage. Memory stores data and is directly accessible to the CPU. Data may include cache lines, pages, ranges, objects, or any other format that allows information to be transferred to memory. Under the traditional hierarchy, memory contains additional subdivisions for processor registers, processor cache, and main memory. In contrast, storage stores data but is not directly accessible to the CPU and instead transfers data to and from memory in order for that data to be accessible to the CPU.

Technologies in memory and storage vary in volatility, capacity, cost, energy use, and performance. Typically, the closer to the CPU a technology is in the traditional hierarchy, the faster it is designed to perform. These faster memory technologies, however, are typically more expensive and lower capacity than other memory and storage technologies. To balance this, lower tiers of the traditional hierarchy use memory and storage technologies that, while slower, are less expensive and have higher data capacity. Furthermore, while some computing environments can enable some migration capability from one technology to another, these solutions do not work at the hardware and firmware level and instead are implemented using application software.

BRIEF DESCRIPTION OF THE DRAWINGS

Certain exemplary examples are described in the following detailed description and in reference to the drawings, in which.

In accordance with implementations described herein.

In accordance with implementations described herein.

In accordance with implementations described herein.

In accordance with implementations described herein.

In accordance with implementations described herein.

DETAILED DESCRIPTION

The techniques and examples described herein disclose the use of a unifying memory controller (UMC) that controls data placement and retrieval across a variety of memory and storage locations, for example, of different memory technologies. The UMC is considered "unifying" in that it may be the only memory controller attached to all of the memory technologies being controlled. The UMC may also be considered "unifying" in that it may present the multiple memory technologies it controls as a single address range to a local host to which the UMC is connected.

A UMC may be a circuit composed of electronic components which are connected by conductive wires or traces through which electric current can flow. As used herein, a local host may refer generally to a computer with a processor to which the UMC is connected. The UMC may also be embedded within local host or connected electronically or via photonics. Placement and retrieval of data by the UMC may be determined by the application of a policy implemented by the policy engine of the UMC. Examples of policy driven action include relocation of data between types of memory as discussed herein. To aid in the implementation of a policy, the UMC may privately store properties about the data including if the data should be stored persistently or the time the data was last placed or retrieved. Additionally, the UMC may also selectively power on and off locations in memory to conserve power. Furthermore, the UMC may optionally migrate data from one device or memory bank to another in order to free up ranges of memory to power off. Selectively or optionally taking an action depends on the particular policy being implemented and whether or not the policy directs the UMC to take one action or another.

As used herein, a UMC may also be configured to connect with additional memory controllers via an interconnect, wherein each memory controller may be associated with its own local host, memory, or storage technologies. A connected UMC may determine the placement and retrieval of data to and from the pool of the connected memory and local hosts through the use of the connected memory controllers. To aid in the implementation of a policy across multiple connected memory controllers, a UMC may privately store additional properties about the data such as the frequency particular data is retrieved by a particular host. This frequency measure addresses the data itself and not necessarily the location in memory where the data is stored. Additionally, the UMC may also selectively provide power to, or even unpower, various locations of connected memory or storage to conserve power.

Figure 1:
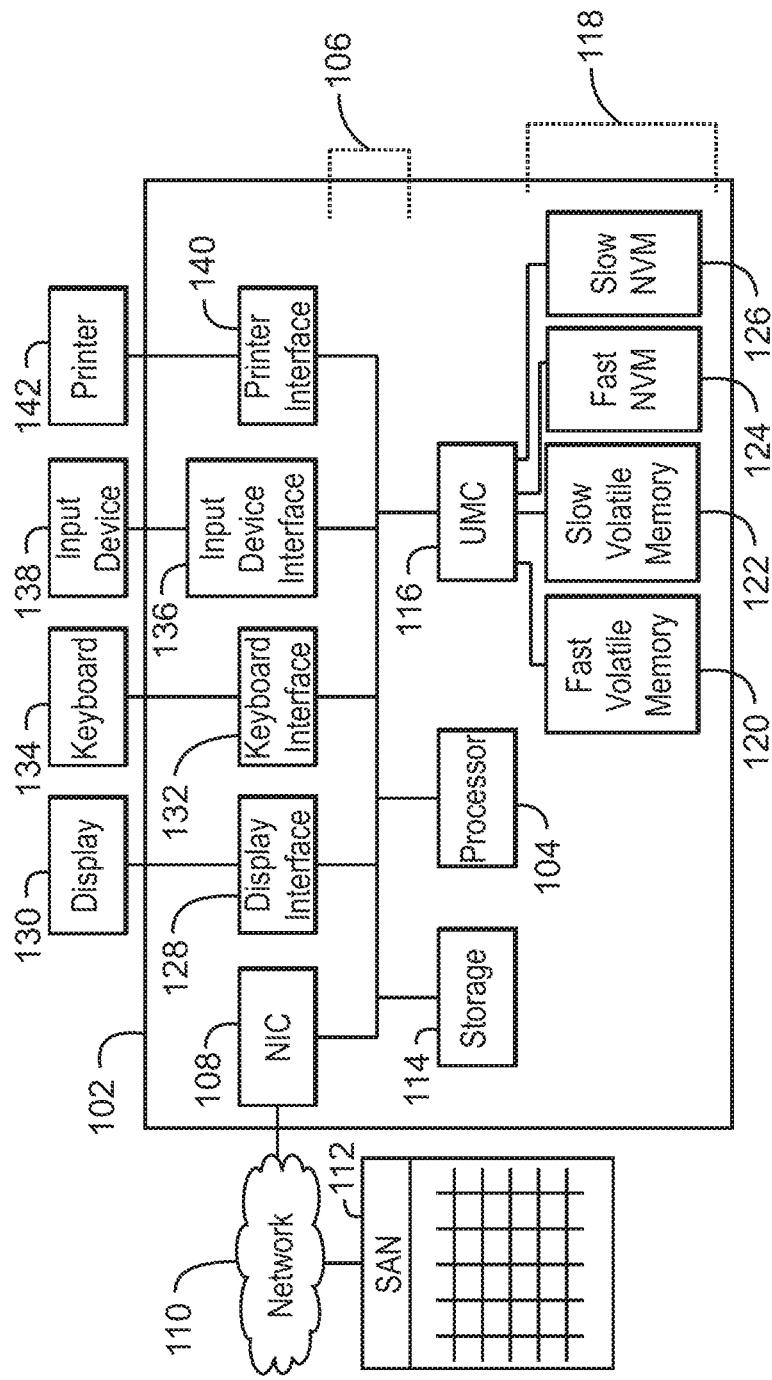
FIG. 1 shows a block diagram of an example system that includes a computing device that can be used to control a UMC.

FIG. 1 shows a block diagram of an example system that includes a computing device 102 that can be used to control a UMC. The computing device 102 includes a processor 104. The processor 104 can be a single core processor, a multi-core processor, a computing cluster, a virtual processor implemented in a computing cluster, or any number of other suitable configurations. The bus 106 may couple the processor 104 to other objects within the computing device 102. The bus 106 may be any communication system that transfers data between components in a computer including connections by electrical wires, optical wires, or other similar mediums of exchange. Further the bus may include systems like AMBA, PCI, PCI Express, HyperTransport, InfiniBand, and other similar systems.

The bus 106 may couple the processor 104 to a network interface controller (NIC) 108. The NIC 108 may be used to provide the computing system with access to a network 110. The network 110 may be a private corporate network, a public network, such as the Internet, or a combined public and private network, such as a corporate network in which multiple sites are connected through virtual private networks over a public network.

The network 110 may further provide access to a storage system, such as a storage array network (SAN) 112. A storage array network (SAN) is a dedicated network that provides access to consolidated data storage and enables a host client device to access or manage data volumes stored in a storage array. Code, or portions thereof, to run the system may be located in the SAN 112. In some examples, where code for running the system 100 is located elsewhere, a SAN 112 may not be present in the system 100.

The bus 106 may couple the processor 104 to storage 114 located inside the computer device 102. The storage 114 may include a hard drive, an optical drive, a thumb drive, a solid-state RAM drive, or any number of other devices. The storage 114 can be used to store data of the computer device 102. Code, or portions thereof, to run the system 100 may be located in storage 114. However, depending on where code and other data is stored, the storage 114 may be omitted.

The processor 104 is further coupled via the bus 106 to a unifying memory controller (UMC) 116 that is connected to and manages data placement and retrieval across a variety of memory locations 118. The memory locations 118 can be from a variety of memory technologies including fast volatile memory 120, slow volatile memory 122, fast non-volatile (NVM) 124, and slow NVM 126. Data sent to the UMC 116 may commit the data to any of the connected memory locations. Code, or portions thereof, to run the system may be located in the memory locations of the UMC 116.

Memory locations may include separate physical locations in memory, separate logical locations in memory, separate memory devices, and, as noted, are not limited to a single memory technology. Physical locations in memory may be separate physical locations within a single memory device or may be separate physical locations in several memory devices. Separate logical locations in memory may be separate virtual locations in a single memory device or may be separate virtual locations in several memory devices. A memory device includes physical structures for storing data directly accessible to the CPU and can include random access memory modules, Non-Volatile Memory (NVM) modules, and read only memory (ROM) modules, although a memory device is not limited to these technologies.

One traditional characteristic of faster performing memory technologies is volatility, e.g., the memory uses power to retain its stored data. Fast volatile memory 120 may include random access memory such as static random access memory (SRAM) and dynamic random access memory (DRAM). Fast volatile memory 120 may also include developing technologies such as zero-capacitor random access memory (Z-RAM), thyristor random access memory (T-RAM), and twin transistor random access memory (TTRAM), or any other type of memory with similar access speed and volatility characteristics. Slow volatile memory 122 may include slower and often less expensive SRAM and DRAM drives or any other memory technology that is similarly volatile and relatively slower than fast volatile memory 120.

In contrast, non-volatile memory (NVM) does not require power to retain its stored data. Traditionally, non-volatile memory has included slower and longer-term storage technologies such as ROM and hard disk drives. However recently, faster forms of NVM have been developed and may reach similar speeds, capacities, and possibly greater capacities as volatile memory technologies in use. Fast NVM 124 may include phase-change memory (PCRAM), spin-transfer torque random access memory (STTRAM), resistive random access memory (ReRAM), ferroelectric random access memory (FeRAM), or any other memory technology with similar access speed and nonvolatile characteristics. Slow NVM 126 may include read only memory (ROM) or any other memory technology that is similarly nonvolatile and relatively slower than fast NVM 124.

The processor 104 may be coupled to a display interface 128 through the bus 106. The display interface 128 may drive a display 130. The display 130 can include, for example, a monitor, a projector, a flat panel screen, or a combination thereof.

The processor 104 may be coupled to a keyboard interface 132 through the bus 106. The keyboard interface 132 may couple the computing device 102 to a keyboard 134. The keyboard 134 may be a full keyboard, a keypad, or panel controls on a server unit.

The processor 104 may be coupled to an input device interface 136 via the bus 106. The input device interface 136 may couple the computing device 102 to an input device 138. The input device 138 may be a pointer such as a mouse, trackpad, touchscreen, or another device that facilitates human control and input.

The processor 104 may be coupled to a printer interface 140 through the bus 106. The printer interface 140 may couple the computing device 102 to a printer 142.

The computing system 100 is not limited to the devices described above. For example, if the computing device 102 is a server, devices used for interfacing with a user, such as the display 130, keyboard 134, and printer 142, among others, may be omitted. Further, other devices may be present in some examples, such as multiple NICs 108.

Figure 2:
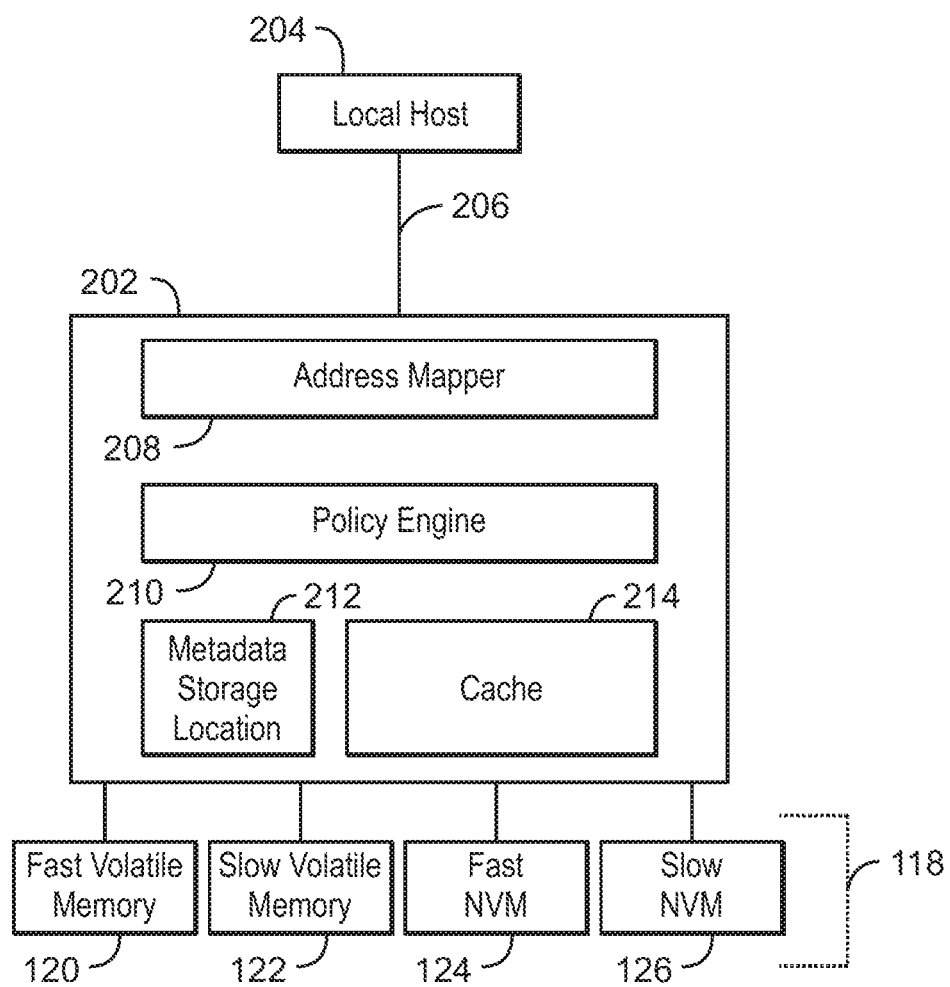
FIG. 2 shows a block diagram of an example device including a UMC configured to manage data placement and retrieval across a variety of memory locations.

FIG. 2 shows a block diagram of an example device 200 including a UMC configured to manage data placement and retrieval across a variety of memory locations 118. The like numbered items are as described with respect to FIG. 1. The UMC 202 interfaces to a local host 204 via a communication link 206. The communication link 206 may be a physical connection between the local host 204 and the UMC 202. The communication link may also be a wireless connection between the local host 204 and the UMC 202. The communication link 206 transmits data to the local host 204 from the UMC 202 and vice versa. This data transmission may occur via packets, pages or any other means of electronically transmitting data.

The UMC 202 connects to one or more locations 118. The UMC includes an address mapper 208, a policy engine 210, a metadata storage location 212, and a cache 214. The address mapper 208 may map the virtual address of data to its physical address in memory. The policy engine 210 may be part of a hardware circuit that can be controlled through software libraries, such as operating environment, platform, or potentially application-level access. For example, an EEPROM, or other nonvolatile memory, may hold policies downloaded from a SAN or other network location.

The use of software libraries may provide an optimization algorithm as the policy for the policy engine 210 to implement through the UMC 202 and the properties about the data stored in the metadata storage location 212. The optimization algorithm may be designed to make the most efficient use of memory, and may include the application of heuristic methods, as outlined in the examples. The cache 214 may store copies of data the UMC 202 is retrieving for the local host 204 or migrating between memories 118. The metadata storage location 212 may privately store properties about the data which includes any tags or hints provided by the local host 204 to assist the policy engine 210 in applying a policy. Properties about the data can also include any information about the data about when it has been retrieved, which host is retrieving the data, if there are multiple hosts, or simply the number of times the particular data has been retrieved. Tags or hints can include anything provided by the local host 204 to assist the policy engine 210 apply a policy, for example, a tag from the local host 204 may be that data is either 'persistent' or 'non-persistent'. The result of the policy engine 210 applying a policy, e.g., application of optimization algorithms or heuristics, may be demonstrated by the use of examples described herein.

Figure 3:
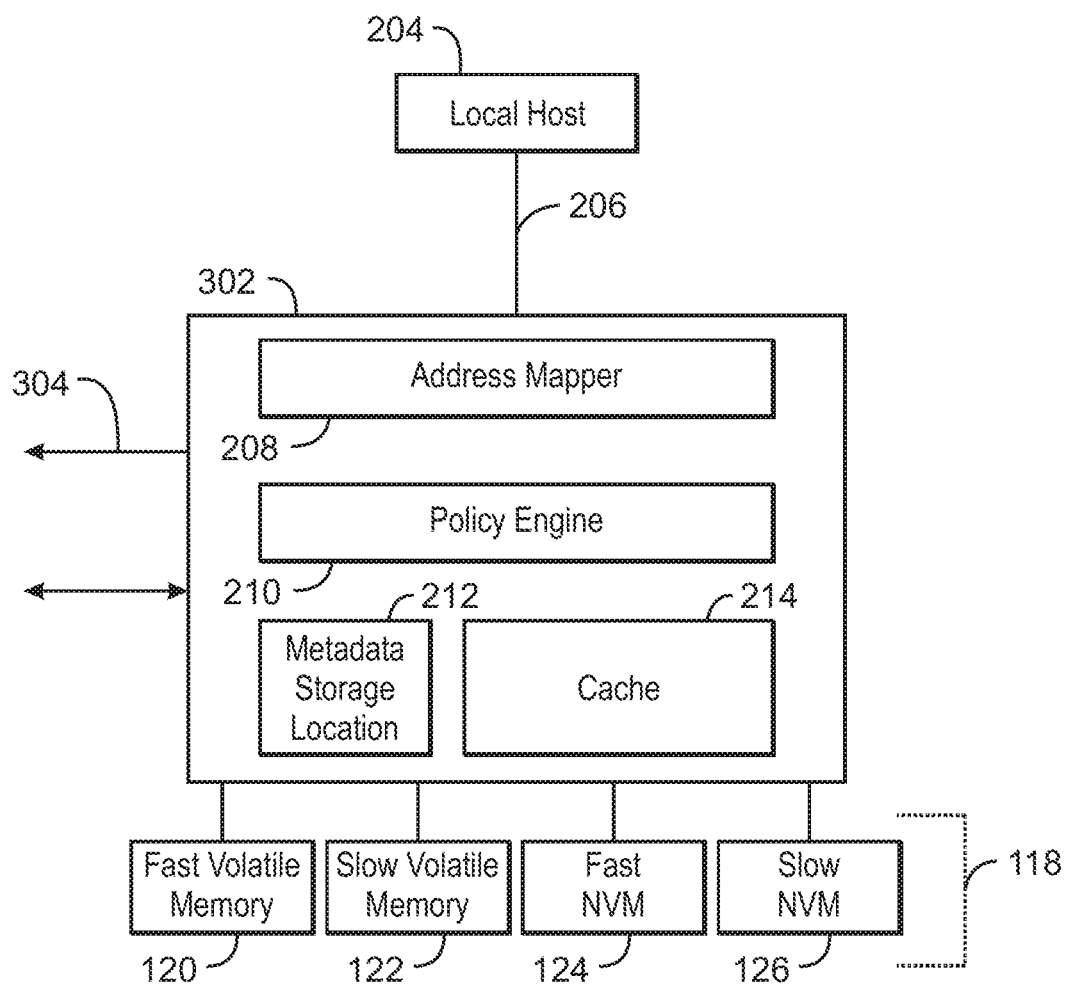
FIG. 3 shows a block diagram of an example device including a UMC to manage data placement and retrieval across a variety of memory locations as well as connect to other controllers and hosts via an interconnect.

FIG. 3 shows a block diagram of an example device 300 including a UMC 302 to manage data placement and retrieval across a variety of memory locations 118 as well as connect to other controllers and hosts via an interconnect 304. The like numbered items are as described with respect to FIGS. 1 and 2. In this example, the UMC 302 connects to additional memory controllers and hosts via the interconnect 304. The interconnect 304 may be a physical connection between the UMC 302 and the additional memory controllers and hosts. The interconnect 304 may also be a wireless connection between the UMC 302 and the additional memory controllers and hosts. The interconnect 304 transmits data to the additional memory controllers from the UMC 302 and vice versa. This data transmission may occur via packets, pages or any other means of electronically transmitting data.

Depending on the policy being implemented, the additional memory controller may relay data to another attached local host for use. Alternatively, the additional memory controllers could be directed to store data in its own local memory. Furthermore, the additional memory controller could be used to relay data to a third memory controller or any number of chained memory controllers. This chaining of memory controllers provides the UMC 302 the ability to control the placement of data for each of the connected controllers. Further, chaining of memory controllers allows the UMC 302 to utilize each of the connected resources including placing data across any connected memory device or serving data to any connected local host. This figure also contemplates the connection of memory controllers in order to facilitate switched fabrics, star fabrics, fabric computing, or any other configurations of interconnected nodes.

Figure 4:
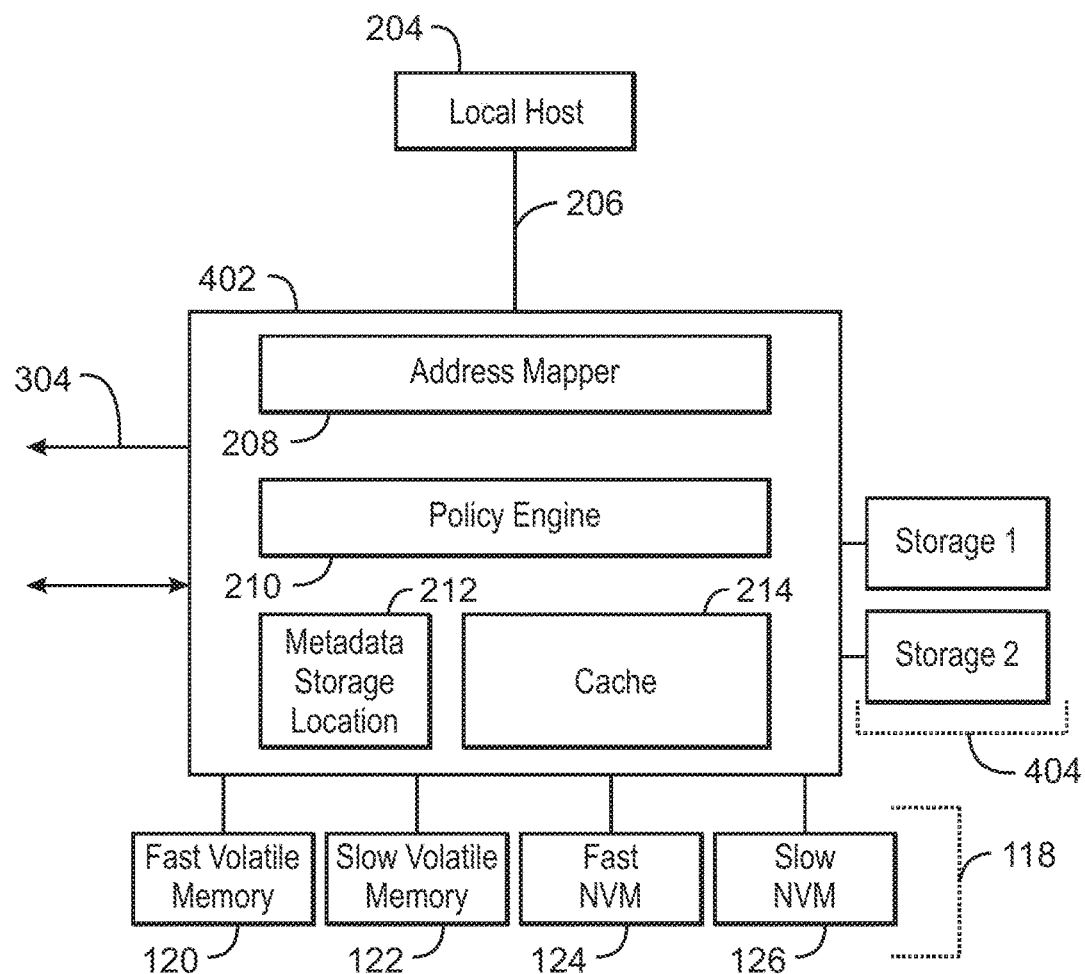
FIG. 4 shows a block diagram of an example device including a UMC to manage data placement and retrieval across a variety of memory locations and storage locations, as well as connect to other controllers and hosts via an interconnect.

FIG. 4 shows a block diagram of an example device 400 including a UMC 402 to manage data placement and retrieval across a variety of memory locations 118 and storage locations 404, as well as connect to other controllers and hosts via an interconnect 304. The like numbered items are as described with respect to FIGS. 1, 2, and 3. The storage locations 404 can include non-solid state storage directly connected and controlled by the UMC 402. Similarly if the UMC 402 is connected to additional memory controllers which themselves are connected to storage locations, these devices may all be pooled and controlled by the UMC 402. See below for examples that show migrating data to non-solid state storage such as a hard disk drive.

Figure 5:
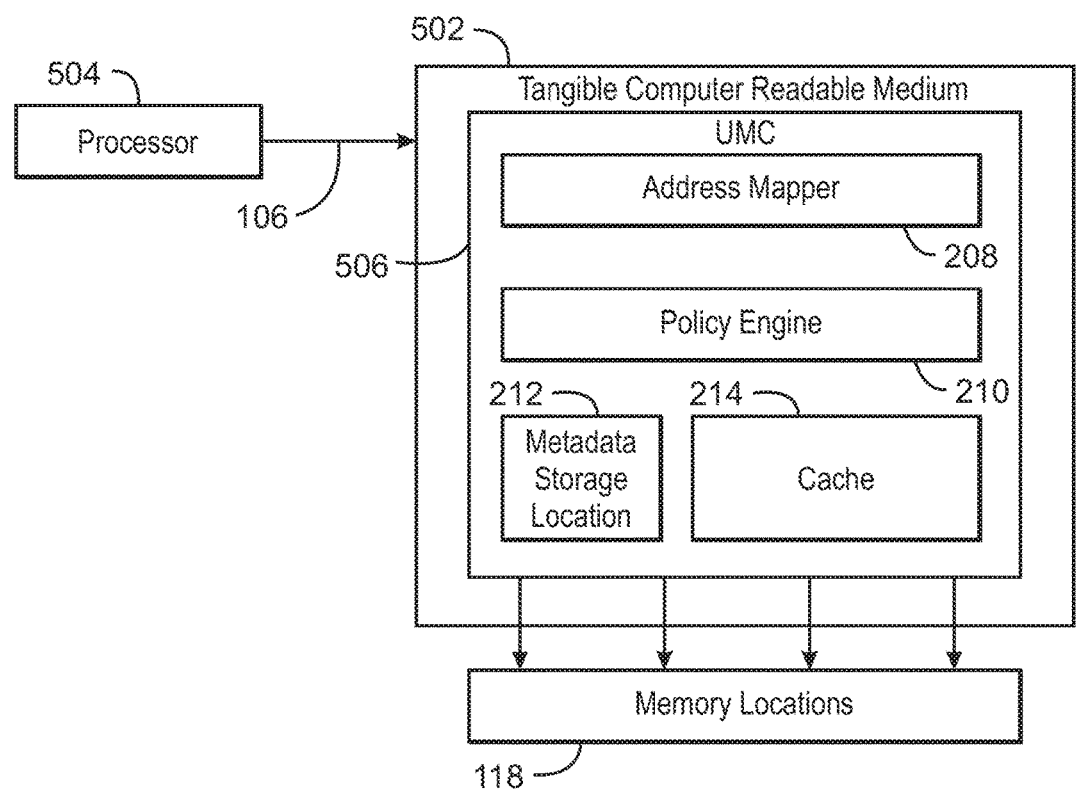
FIG. 5 shows a block diagram of an example device and tangible computer readable medium that includes code configured to direct a processor to manage data placement and retrieval across a variety of memory locations via a UMC located on the computer readable medium; and In accordance with implementations described herein.

FIG. 5 shows a block diagram of an example device 500 and tangible computer readable medium 502 that includes code configured to direct a processor 504 to manage data placement and retrieval across a variety of memory locations 118 via a UMC 506 located on the computer readable medium 502. Like numbered items are as discussed with respect to FIGS. 1 2, 3, and 4.

"Computer-readable medium" can be any medium that can contain, store, or maintain program instruction and data for use by or in connection with the instruction execution system such as a processor. Computer readable medium can comprise any one of many physical medium such as, for example, electronic, magnetic, optical, electromagnetic, or semiconductor medium. More specific examples of suitable computer-readable medium include, but are not limited to, a magnetic computer diskette such as floppy diskettes or hard drives, a random access memory (RAM), nonvolatile memory (NVM), a read-only memory (ROM), an erasable programmable read-only memory, or a portable device such as a compact disc (CD), thumb drive, or a digital video disc (DVD).

In this example, the tangible computer readable medium 502 on which the UMC 506 is located may be a memory location of any memory technology as described above. An address mapper 208, policy engine 210, a metadata storage location 212, and a cache 214 are each located on the tangible compute readable medium 500 and more specifically within the UMC 506. Each are as described as above.

In the present figure, the UMC 506 is positioned on the tangible computer readable medium 502, and coupled to the processor 504 via a bus 106. However, in other examples, the tangible computer readable medium 502 and UMC 506 may be co-located on the processor 504. Further, in this example, the attached memory locations 118 may also be managed as an additional last level cache for the CPU.

Figure 6:
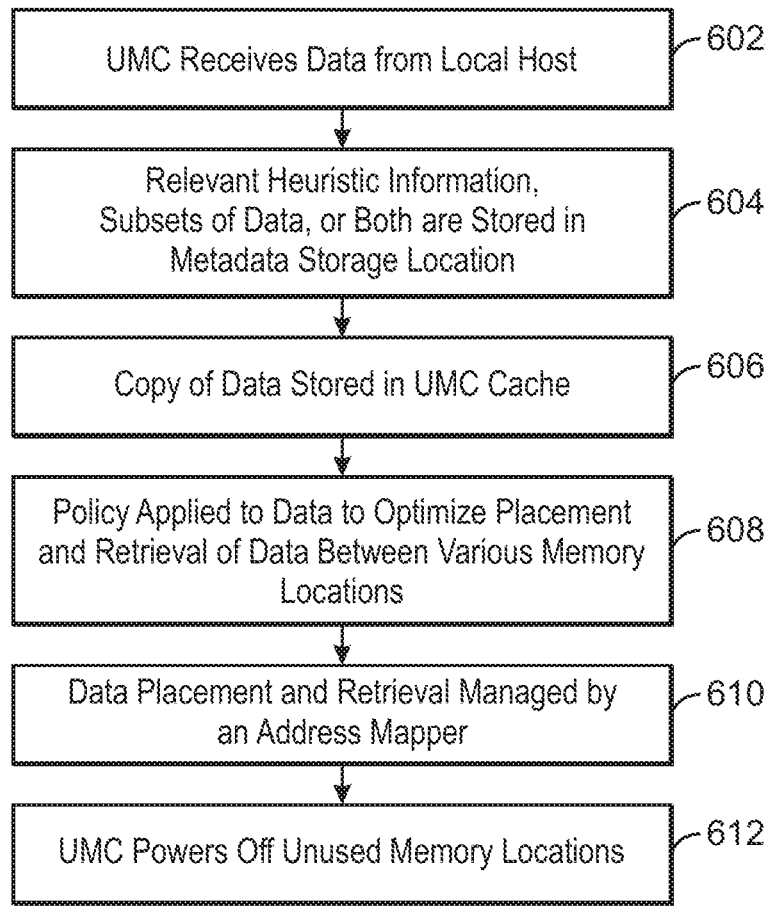
FIG. 6 shows a flow diagram of an example process for managing data placement and retrieval across a variety of memory and storage locations with a UMC.

FIG. 6 shows a flow diagram of an example process 600 for managing data placement and retrieval across a variety of memory and storage locations with a UMC. The process begins at block 602, where a UMC, for example, as described with respect to FIGS. 1-5, receives data from a local host 204 via a communications link 206.

In accordance with implementations described herein. FIG. 6 shows a flow diagram of an example process for managing data placement and retrieval across a variety of memory and storage locations with a UMC.

At block 604, the circuit stores any relevant heuristic information or subsets of the data in a metadata storage location. At block 606, the circuit stores a copy of the data in a cache.

At block 608, the circuit applies a policy to the data in order to determine placement and retrieval of the data between the memory locations 118. The determination may be based, at least in part, on a property about the data that is stored in the metadata storage location. The determination may also be based on relevant heuristic information about the data managed by the circuit, subsets of the data, or both.

At block 610, the circuit manages data placement and retrieval via an address mapper across a plurality of memory locations 118. At block 612, the circuit powers off unused memory locations. The circuit may then execute other instructions or may repeat the procedure starting again at block 602 if the UMC has received additional data.

EXAMPLES

In a first example, data may be tagged to be persistent and sent to the UMC. The UMC may initially commit this data to fast NVM (such as PCRAM, STTRAM, or ReRAM) while placing a copy in a fast local cache. An optimization algorithm may determine that a location of data in NVM is not likely to be referenced in the near future. The UMC may thus move this location to a slower, denser form of persistent storage (e.g., slow NVM) to free up the fast NVM, thereby enabling higher system performance.

In another example, the UMC can migrate data from one of the memory locations to another to allow higher power memory technologies to be powered down. The powering down ability further allows the UMC to exploit the beneficial properties of a particular memory technology to optimize performance, power consumption, and component cost. Powering down a memory location may include powering down separate locations within the same memory device. For example, data may be migrated from several memory locations, or blocks, in a single memory device to a single memory location or block in that same device. Once migrated, the unused memory locations or blocks may be powered down. Such a memory device may separate each block of memory so that each block may be separately powered from a voltage source coupled to a controlling transistor.

In another example, the UMC may move locations in fast NVM to slow NVM, for example, if the UMC policy engine (210) has determined by examining the properties that the data are not likely to be referenced in the near future. An example of this is by moving data from fast NVM to slow NVM which has not been retrieved recently or frequently. Furthermore, if the UMC determines through similar heuristics or optimizing algorithms that the data is unlikely to be retrieved for a longer duration, locations of slow NVM can be compressed or moved to even slower, denser, non-solid state storage. For example, the UMC may be used to control disk drive locations in addition to solid state memories. This enables greater efficiency and utilization of the higher performing memories and system.

One example, would be a blade server with multiple memory controllers each with multiple memory locations connected to each other. The benefit of interconnected memory controllers and their associated local hosts or memory locations becomes apparent with, at least, the pooling of memory locations, the ability of the UMC to manage these resources, and the ability of the UMC to power off unused locations in memory as described above.

In another example, in a system with two or more connected memory controllers, at least one of them being a UMC, the memory controllers cooperate in a manner such that data with an affinity to the requesting host is moved or migrated to the domain or span closest to the host via, in part, the memory controller controlling that closest domain or span. Affinity can be determined using a property stored on the metadata storage location of the UMC. One example of a property could be the frequency a particular host has retrieved a particular set of data. Another stored property could be how recently a particular host has retrieved a particular set of data. Another property could be the access history of a particular piece of data. Moving data by affinity may improve overall performance by reducing distance and therefore latency to data. If the dataset happens to create a "hot spot", meaning buffers and interfaces near a particular host become congested leading to long request and return latencies (as measured by the UMC), the data can likewise be distributed among multiple memory controllers and nearby memory locations to ease congestion.

In another example, in a system with two or more memory controllers, where at least one of the memory controllers is a UMC, the memory controllers cooperate in a manner to provide shared pools of memory. For example, if a given memory controller utilizes all of its fast volatile memory, but another connected memory controller is under-utilized, the memory controllers could function as one providing the illusion of a larger fast volatile memory location for a given host. Further, this memory partitioning by the UMC can be static or dynamic in terms of the size of the memory partitions. The connected memory controllers further allow for the avoidance of captive or stranded data in a given NVM or device by enabling alternate paths to a particular host.

In another example, in a system with two or more connected memory controllers, where at least the memory controllers is a UMC, the memory controllers cooperate in a manner that provides high availability functions such as RAID via a UMC managing and directing the duplication or copying of data in multiple memory and/or storage locations.

In another example, the UMC determines, based on a policy, if data located in a fast NVM should be moved into a slow NVM based on a stored property. If yes, then data is moved by the circuit from a fast NVM into a slow NVM. Otherwise, the data is not moved.

Another example discloses implementing a policy to consolidate data from several memory locations by migrating the data to more contiguous memory locations. The circuit can then determine if memory locations are unused. If the circuit determines that there are unused memory locations then the circuit may no longer need to provide power in the maintenance and management of these unused memory locations. Otherwise, no action need be taken.

While the present techniques and examples may be susceptible to various modifications and alternative forms, the exemplary examples discussed above have been shown only by way of example. It is to be understood that the techniques and examples are not intended to be limited to the particular examples disclosed herein. Indeed, the present techniques include all alternatives, modifications, and equivalents falling within the true spirit and scope of the appended claims.

As discussed above, this invention provides several advantages over existing solutions. It provides better utilization of scarce, higher performing memory locations. It supports shared memory/storage "pools" for utilizing a wider variety and higher capacity of memory locations. It enables higher performance through smart placement of data (e.g. data is moved closer to the requesting compute resource).

Further, a UMC has greater flexibility in moving data around in order to provide power or unpower resources as needed thereby improving energy efficiency. By putting intelligent heuristics management at the hardware level, relevant statistics can be collected on data retrieval patterns anywhere in the system as heuristic information which allows global optimizations between software domains. As discussed throughout this disclosure, optimizing algorithms need not project future frequency of data access, but instead may rely on the gathered statistics for optimizing access and retrieval of data. Furthermore, the optimizing algorithm need not calculate transit time between each processors or multiple local hosts. This action can be approximated by simply moving data physically closer to the particular processor or local host in question. Data management herein disclosed is performed in real time, and is designed for implementation in an online system as opposed to one that is offline, e.g., not currently in operation. In other words, in certain examples, the invention may not know or be able to predetermine the specific data to be accessed for the purposes of data placement and migration and instead operates in real time using stored properties.

What is claimed is:
1. A unifying memory controller, comprising:
a circuit to:
   connect to a local host such that the circuit can send and receive data to and from the local host via a communication link; and
   manage data placement and retrieval via an address mapper across a plurality of memory locations;

a metadata storage to store a property of the data managed by the circuit;

a policy engine to apply a policy to data managed by the circuit in order to determine placement and retrieval of the data between the plurality of memory locations, wherein the policy determines placement and retrieval of data based on the property about the data stored in the metadata storage; and a cache to store copies of data managed by the circuit;

wherein the circuit is to migrate data between a fast nonvolatile memory location and a slow nonvolatile memory location; and implementing a policy determines from stored properties that the data stored in a fast nonvolatile memory location has not been retrieved within a policy determined time frame;

wherein the circuit is to connect with at least one additional memory controller, wherein each additional connected memory controller is to manage data placement and retrieval for a plurality of additional memory locations; and wherein the policy engine implements the policy in cooperation with an additional policy engine in the at least one additional connected memory controller to determine data placement and retrieval across the additional memory locations, wherein the data are accessed by an additionally connected local host connected to each additionally connected memory controller.

2. The unifying memory controller of claim 1, wherein the circuit is to migrate data between a fast nonvolatile memory location, a slow nonvolatile memory location, a fast volatile memory location, and a slow volatile memory location.

3. The unifying memory controller of claim 1, wherein the circuit is to:

migrate data stored in a number of memory locations to a smaller number of one or more memory locations resulting in unused memory locations; and selectively provide power to a plurality of unused memory locations.

4. The unifying memory controller of claim 1, wherein:

the policy engine is to implement a policy through the circuit that provides RAID capability using connected memory controllers and the memory locations of the connected memory controllers.

5. The unifying memory controller of claim 1, wherein the metadata storage stores a frequency that a particular additional memory controller of the at least one additional memory controllers has accessed a data element, and the circuit is to migrate the data to memory controlled by the additional memory controller based on the frequency.

6. The unifying memory controller of claim 1, wherein the stored properties include a tag describing the data received from the local host.

7. The unifying memory controller of claim 6, wherein the policy is selected from a plurality of policies based on the tag.

8. The unifying memory controller of claim 1, wherein the tag describes whether the data associated with the tag is persistent or non-persistent.

9. The unifying memory controller of claim 1, wherein the circuit is further to manage data placement across a plurality of storage locations.

10. The unifying memory controller of claim 1, wherein the policy engine is to store a plurality of policies and to select the policy from the plurality of policies.

11. A computing system, comprising:
a processor to execute stored instructions;
a memory that stores instructions; and
a unifying memory controller (UMC), the memory controller comprising:
a circuit to:
connect to the processor such that the circuit can send and receive data to and from the processor via a communication link; and
manage data placement and retrieval via an address mapper across a plurality of memory locations;
a metadata storage location to store a property of the data managed by the circuit;
a policy engine to apply a policy to data managed by the circuit in order to determine placement and retrieval of the data between the plurality of memory locations, wherein the policy is to determine placement and retrieval of data based on the property about the data that is stored in the metadata storage location; and
a cache to store copies of data managed by the circuit;
wherein the circuit is to migrate data stored in a number of memory locations to a smaller number of memory locations resulting in unused memory locations; and selectively provide power to a plurality of unused memory locations;
wherein the circuit is to connect with at least one additional memory controller, wherein each additional connected memory controller is to manage data placement and retrieval for a plurality of additional memory locations; and
wherein the policy engine implements the policy in cooperation with an additional policy engine in the at least one additional connected memory controller to determine data placement and retrieval across the additional memory locations, wherein the data are accessed by an additionally connected local host connected to each additionally connected memory controller.

12. The computer system of claim 11, wherein the circuit is to migrate data between a fast nonvolatile memory location and a slow nonvolatile memory location.

13. The computer system of claim 12, wherein the circuit is to migrate data when a policy engine implementing a policy determines from stored properties that the data stored in a fast nonvolatile memory location has not been retrieved within a policy determined time frame.

14. The system of claim 11, wherein the metadata storage location stores a frequency that another memory controller has accessed a data element, and
the circuit is to migrate the data to memory controlled by the other memory controller based on the frequency.

15. The computing system of claim 11, further comprising a storage comprising a plurality of storage locations, and wherein the circuit of the memory controller is further to manage data placement across the plurality of storage locations.

16. A method of data management via a unifying memory controller circuit comprising:
sending data to and from a local host via a communication link between the local host and the circuit;
storing relevant heuristic information about the data managed by the circuit, subsets of the data, or both in a metadata storage location;
storing copies of data managed by the circuit in a cache;
applying a policy to data managed by the circuit in order to determine placement of the data between a plurality of memory locations, where placement of the data comprises:

determining placement of data based on a property about the data that is stored in the metadata storage location;

managing data placement via an address mapper across a plurality of memory locations by:

determining from a stored property that data stored in a fast nonvolatile memory location has not been retrieved within a policy determined time frame;

migrating that data from a fast nonvolatile memory location to a slow nonvolatile memory location when a policy engine is to implement a policy; and selectively providing power to a plurality of unused memory locations;

connecting the circuit to at least one additional unifying memory controller, wherein each additional connected memory controller is to manage data placement and retrieval for a plurality of additional memory locations; and applying the policy in cooperation with an additional policy engine in the at least one additional connected memory controller to determine data placement and retrieval across the additional memory locations, wherein the data are accessed by an additionally connected local host connected to each additionally connected memory controller.

17. The method of claim 16 wherein the circuit further manages data by:

creating unused memory locations by migrating data stored in a number of memory locations to a smaller number of memory locations; and selectively provide power to a plurality of unused memory locations.

18. The method of claim 16, further comprising storing a frequency that another memory controller has accessed a data element, and migrating the data to memory controlled by the other memory controller based on the frequency.

* * * * *